US009389142B2

(12) United States Patent
Tamura et al.

(10) Patent No.: US 9,389,142 B2
(45) Date of Patent: Jul. 12, 2016

(54) LEAKAGE DIAGNOSIS APPARATUS FOR EVAPORATED-GAS PURGE SYSTEM

(71) Applicant: DENSO CORPORATION, Kariya, Aichi-pref. (JP)

(72) Inventors: Ryo Tamura, Kariya (JP); Yoshinori Maegawa, Obu (JP)

(73) Assignee: DENSO CORPORATION, Kariya (JP)

( * ) Notice: Subject to any disclaimer, the term of this patent is extended or adjusted under 35 U.S.C. 154(b) by 415 days.

(21) Appl. No.: 14/172,209

(22) Filed: Feb. 4, 2014

(65) Prior Publication Data
US 2014/0224212 A1 Aug. 14, 2014

(30) Foreign Application Priority Data

Feb. 14, 2013 (JP) .................................. 2013-26522

(51) Int. Cl.
| | |
|---|---|
| *F02M 33/02* | (2006.01) |
| *G01M 15/04* | (2006.01) |
| *G01M 3/26* | (2006.01) |
| *F02M 25/08* | (2006.01) |

(52) U.S. Cl.
CPC ............ *G01M 15/04* (2013.01); *F02M 25/0809* (2013.01); *G01M 3/26* (2013.01); *G01M 15/042* (2013.01)

(58) Field of Classification Search
CPC ....................... F02D 19/0621; F02D 41/0037
USPC ................................................. 123/518–520
See application file for complete search history.

(56) References Cited

U.S. PATENT DOCUMENTS

| 5,758,628 | A | 6/1998 | Wada | |
|---|---|---|---|---|
| 2001/0029776 | A1 | 10/2001 | Streib | |
| 2004/0089063 | A1* | 5/2004 | Matsubara | ........... F02M 25/089 73/114.41 |
| 2012/0118159 | A1* | 5/2012 | Kitamura | ........... F02M 37/0047 96/152 |
| 2013/0081600 | A1* | 4/2013 | Fukui | ...................... F01N 3/101 123/520 |
| 2014/0119962 | A1* | 5/2014 | Sugimoto | ................ F04C 25/02 417/410.3 |
| 2015/0013437 | A1* | 1/2015 | Takakura | ................ G01M 3/04 73/40.5 R |
| 2015/0040645 | A1* | 2/2015 | Takakura | ........... F02M 25/0818 73/47 |
| 2015/0361929 | A1* | 12/2015 | Tamura | .............. F02M 25/0809 73/114.39 |

* cited by examiner

*Primary Examiner* — John Kwon
(74) *Attorney, Agent, or Firm* — Nixon & Vanderhye PC

(57) ABSTRACT

A leakage diagnosis apparatus is applied to an evaporated-gas purge system including a negative-pressure sensor and a pressure detecting portion. The negative-pressure sensor introduces a negative pressure into an evaporation system. The pressure detecting portion detects the pressure in the evaporation system. The leakage diagnosis apparatus includes a leakage-diagnosis portion and a determining portion. The leakage-diagnosis portion executes a leakage diagnosis to determine whether a leakage of the evaporation system is generated. The determining portion determines whether an evaporated-gas amount in the evaporation system is in an excessive state while the internal combustion engine is stopped. The leakage-diagnosis portion prohibits or terminates the leakage diagnosis, when the determining portion determines that the evaporated-gas amount is in the excessive state.

7 Claims, 12 Drawing Sheets

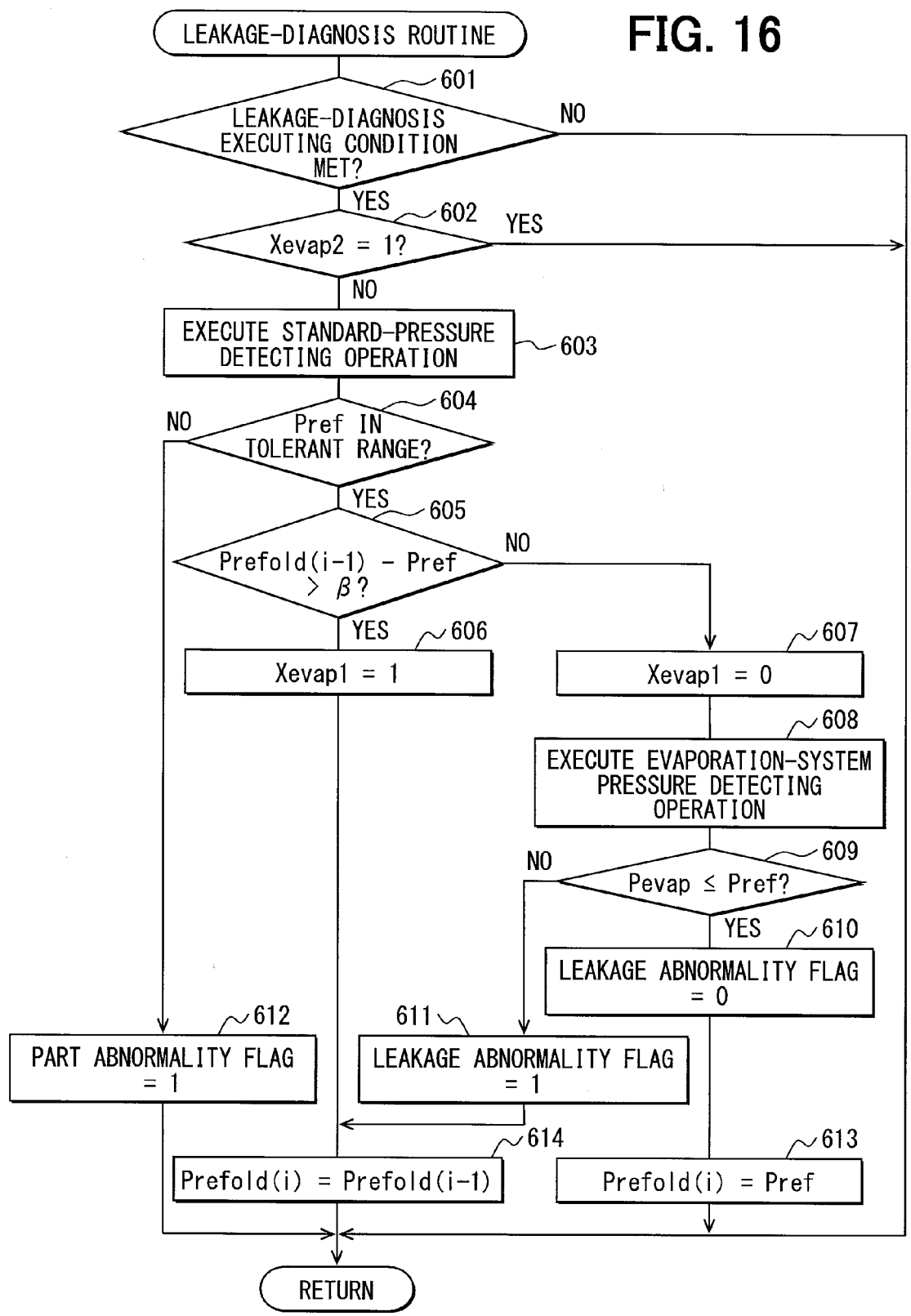

LEAKAGE DIAGNOSIS APPARATUS FOR EVAPORATED-GAS PURGE SYSTEM

CROSS REFERENCE TO RELATED APPLICATION

This application is based on Japanese Patent Application No. 2013-026522 filed on Feb. 14, 2013, the disclosure of which is incorporated herein by reference.

TECHNICAL FIELD

The present disclosure relates to a leakage diagnosis apparatus for an evaporated-gas purge system, in which a leakage diagnosis of the evaporated-gas purge system is executed. In the evaporated-gas purge system, an evaporated gas generated according to an evaporation of a fuel in a tank is purged or discharged to an intake system of an internal combustion engine.

BACKGROUND

Conventionally, in an evaporated-gas purge system, the evaporated gas is adsorbed at a canister to prevent an evaporated gas generated in a tank from being leaked into the atmosphere. Further, since a purge control valve provided in a purge passage communicating with the canister and an intake system of an internal combustion engine is opened, the evaporated gas adsorbed at the canister is purged to the intake system according to a negative pressure of the intake system. The negative pressure corresponds to an intake negative-pressure. It is necessary to detect a leakage of the evaporated gas in an early stage to prevent from leaving a leakage state of the evaporated gas purged from the evaporated-gas purge system to the atmosphere.

For example, JP-H09-296753A (U.S. Pat. No. 5,758,628 A) discloses a technology that the purge control valve is opened to introduce the intake negative-pressure into the tank while the internal combustion engine is operating. Then, the purge control valve is closed, and a variation amount of a pressure in the tank is detected. Further, an abnormality diagnosis is executed to determine whether an abnormality such as the leakage occurred by comparing the variation amount to a determining value. According to JP-H09-296753A, when a concentration of the evaporated gas flowing from the canister into an intake pipe is high while the internal combustion engine is operating, an abnormality determining condition is not met, and the abnormality diagnosis is not executed. Therefore, the evaporated gas of high concentration is prevented from flowing from the canister into the intake pipe while the abnormality diagnosis is executed, and the internal combustion engine is prevented from failing.

However, when an evaporated-gas amount in an evaporation system is excessive such that an evaporated-gas adsorbed amount in the canister becomes a saturation value, the evaporated gas unable to be completely adsorbed at the canister may flow into a leakage-checking module according to a negative-pressure pump. A state that the evaporated-gas adsorbed amount becomes the saturation value is referred to as a saturation state corresponding to a breakthrough state. In this case, when a leakage diagnosis is executed, a diagnosis accuracy of the leakage diagnosis may be lowered due to an affect of a pressure variation according to the evaporated gas. Therefore, it may be erroneously determined about the leakage.

Further, according to JP-H09-296753A, when the concentration of the evaporated gas flowing from the canister into the intake pipe is high while the internal combustion engine is operating, the abnormality diagnosis is not executed in a case where the internal combustion engine is stopped. However, in a case where the concentration of he evaporated gas is low, the evaporated gas may be readily generated after the internal combustion engine is stopped. Therefore, the evaporated-gas amount is increased, and the evaporated-gas adsorbed amount of the canister may be in the saturation state. In other words, since the concentration of the evaporated gas is high when the internal combustion engine is operating, it may be erroneously determined about the leakage, even though the leakage diagnosis is not executed when the internal combustion engine is stopped.

SUMMARY

It is an object of the present disclosure to provide a leakage diagnosis apparatus for an evaporated-gas purge system, in which a diagnosis accuracy of a leakage diagnosis can be ensured when an internal combustion engine is stopped.

According to an aspect of the present disclosure, the leakage diagnosis apparatus is applied to the evaporated-gas purge system including a negative-pressure sensor and a pressure detecting portion. The negative-pressure sensor introduces a negative pressure into an evaporation system having a tank and a canister. The pressure detecting portion detects the pressure in the evaporation system. The leakage diagnosis apparatus includes a leakage-diagnosis portion and a determining portion. The leakage-diagnosis portion executes a leakage diagnosis to determine whether a leakage of the evaporation system is generated based on the pressure in the evaporation system in a case where the negative pressure is introduced into the evaporation system according to the negative-pressure sensor while an internal combustion engine is stopped. The determining portion determines whether an evaporated-gas amount in the evaporation system is in an excessive state while the internal combustion engine is stopped. The leakage-diagnosis portion prohibits or terminates the leakage diagnosis, when the determining portion determines that the evaporated-gas amount is in the excessive state.

BRIEF DESCRIPTION OF THE DRAWINGS

The above and other objects, features and advantages of the present disclosure will become more apparent from the following detailed description made with reference to the accompanying drawings. In the drawings:

FIG. 16 is a flowchart showing a leakage-diagnosis routine according to a third embodiment of the present disclosure.

DETAILED DESCRIPTION

Figure 1:
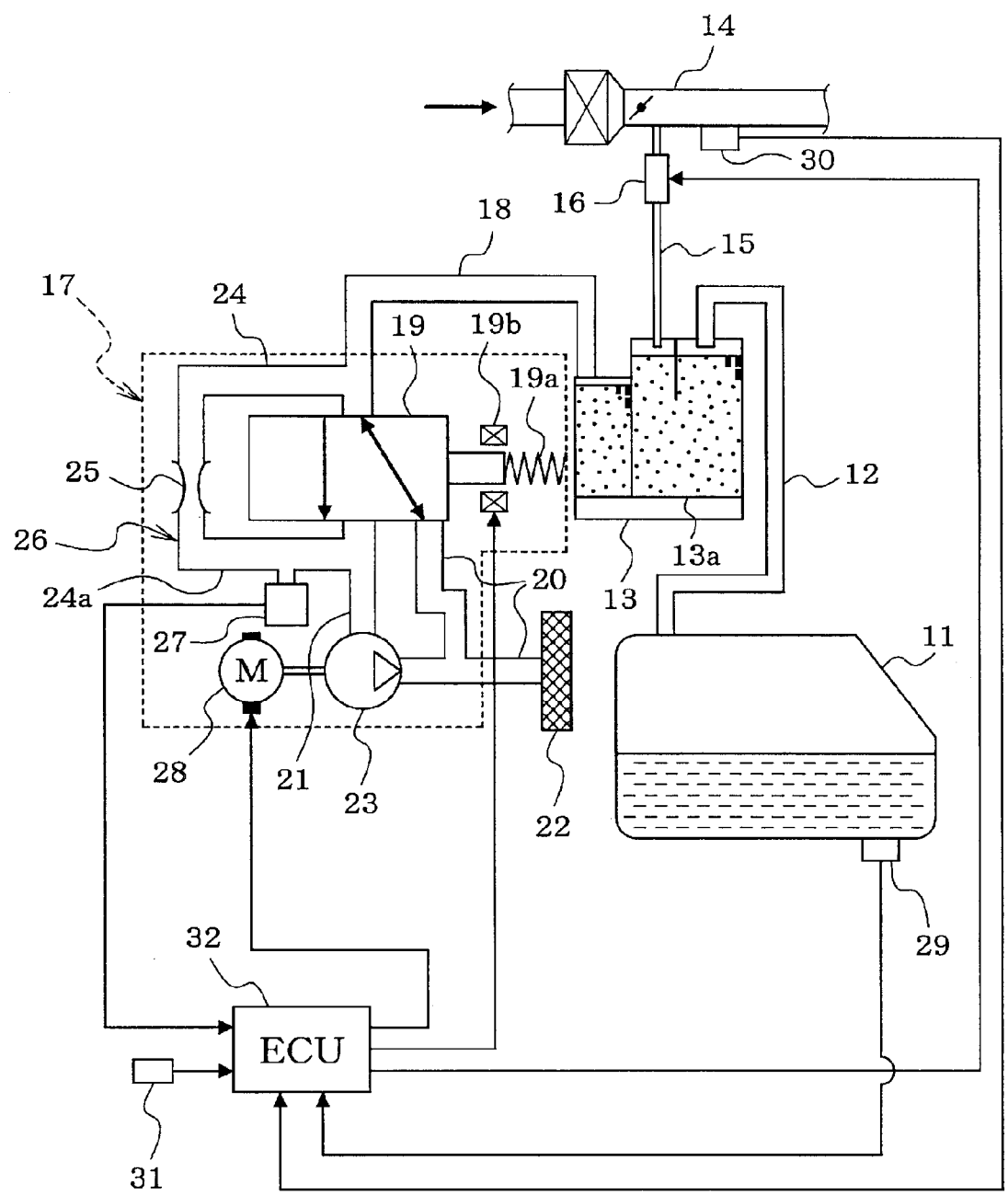
FIG. 1 is a schematic diagram showing an outline of an evaporated-gas purge system according to a first embodiment of the present disclosure.

Embodiments of the present disclosure will be described hereafter referring to drawings. In the embodiments, a part that corresponds to a matter described in a preceding embodiment may be assigned with the same reference numeral, and redundant explanation for the part may be omitted. When only a part of a configuration is described in an embodiment, another preceding embodiment may be applied to the other parts of the configuration. The parts may be combined even if it is not explicitly described that the parts can be combined. The embodiments may be partially combined even if it is not explicitly described that the embodiments can be combined, provided there is no harm in the combination.

Hereafter, embodiments of the present disclosure will be detailed.

First Embodiment

A first embodiment of the present disclosure will be described with reference to FIGS. 1 to 9.

First, referring to FIG. 1, a configuration of an evaporated-gas purge system will be detailed.

A tank 11 is connected with a canister 13 via an evaporation passage 12. The canister 13 receives an adsorber 13a adsorbing an evaporated gas generated according to an evaporation of a fuel in the tank 11. For example, the adsorber 13a may be an activated carbon.

A purge passage 15 is provided between the canister 13 and an intake pipe 14 of an engine, and purges or discharges the evaporated gas adsorbed on the adsorber 13a to the intake pipe 14. The intake pipe 14 corresponds to an intake system, and the engine corresponds to an internal combustion engine. A purge control valve 16 is provided in the purge passage 15 to adjust a purging flow-volume in the purge passage 15. For example, the purge control valve 16 is constructed by a normally closed electromagnetic valve, and is energized by a duty control to adjust the purging flow-volume of the evaporated gas flowing from the canister 13 to the intake pipe 14.

A leakage-checking module 17 is mounted to the canister 13 to execute a leakage diagnosis of an evaporation system from the tank 11 to the purge control valve 16. In this case, the evaporation system includes the tank 11, the evaporation passage 12, the canister 13, the purge passage 15, and the purge control valve 16. In the leakage-checking module 17, a canister communication passage 18 communicating the canister 13 is connected with an atmosphere communication passage 20 or a negative-pressure introducing passage 21 via a passage-switching valve 19. The atmosphere communication passage 20 directly communicates the atmosphere, and has a filter 22 at an end part of the atmosphere communication passage 20. The negative-pressure introducing passage 21 is connected with the atmosphere communication passage 20 via a negative-pressure pump 23 that is electrically powered.

The negative-pressure pump 23 is driven by a motor 28, and discharges a gas from the negative-pressure introducing passage 21 towards the atmosphere communication passage 20.

Figure 2:
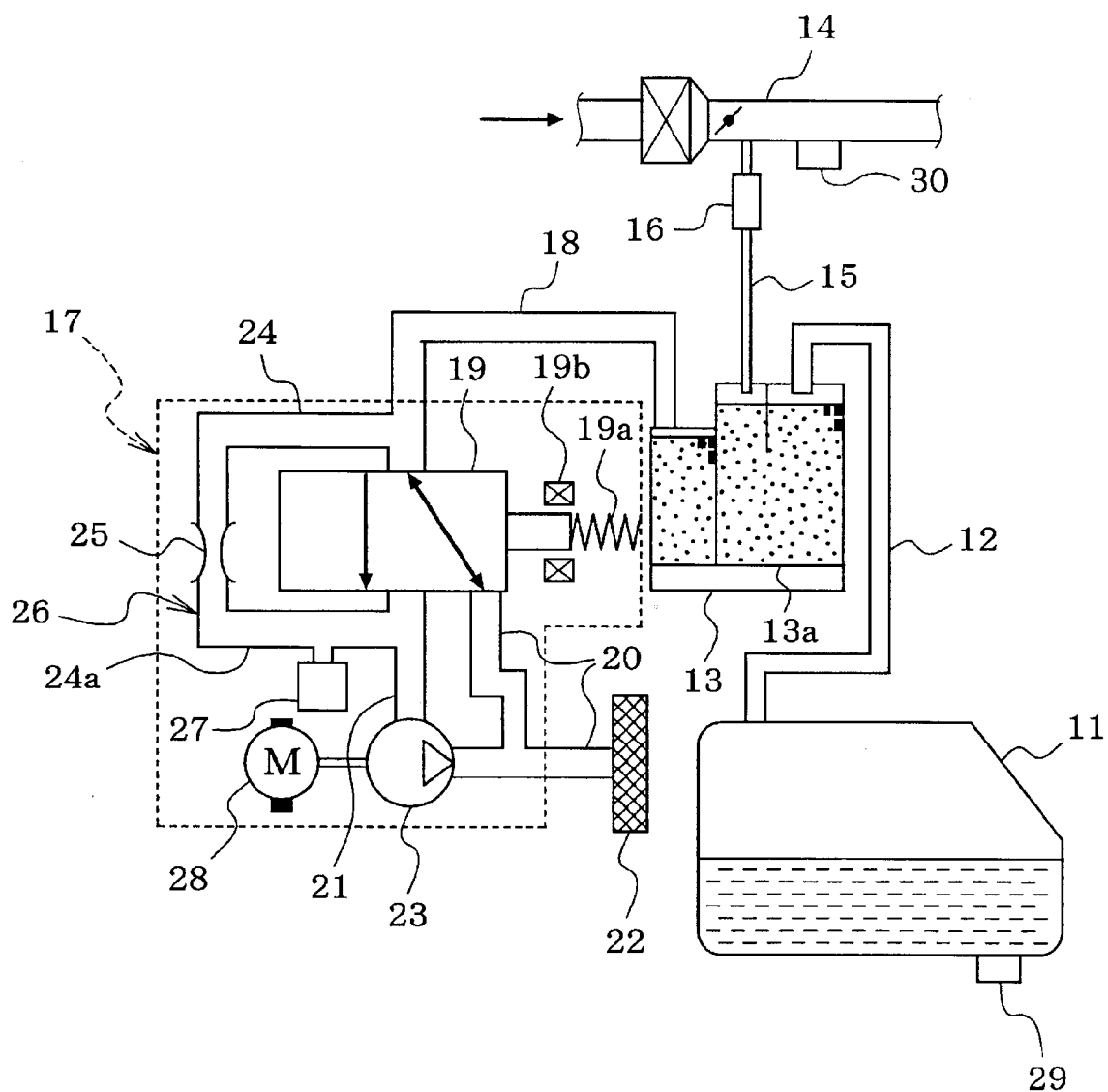
FIG. 2 is a schematic diagram showing a leakage-checking module in a normal state.
Figure 3:
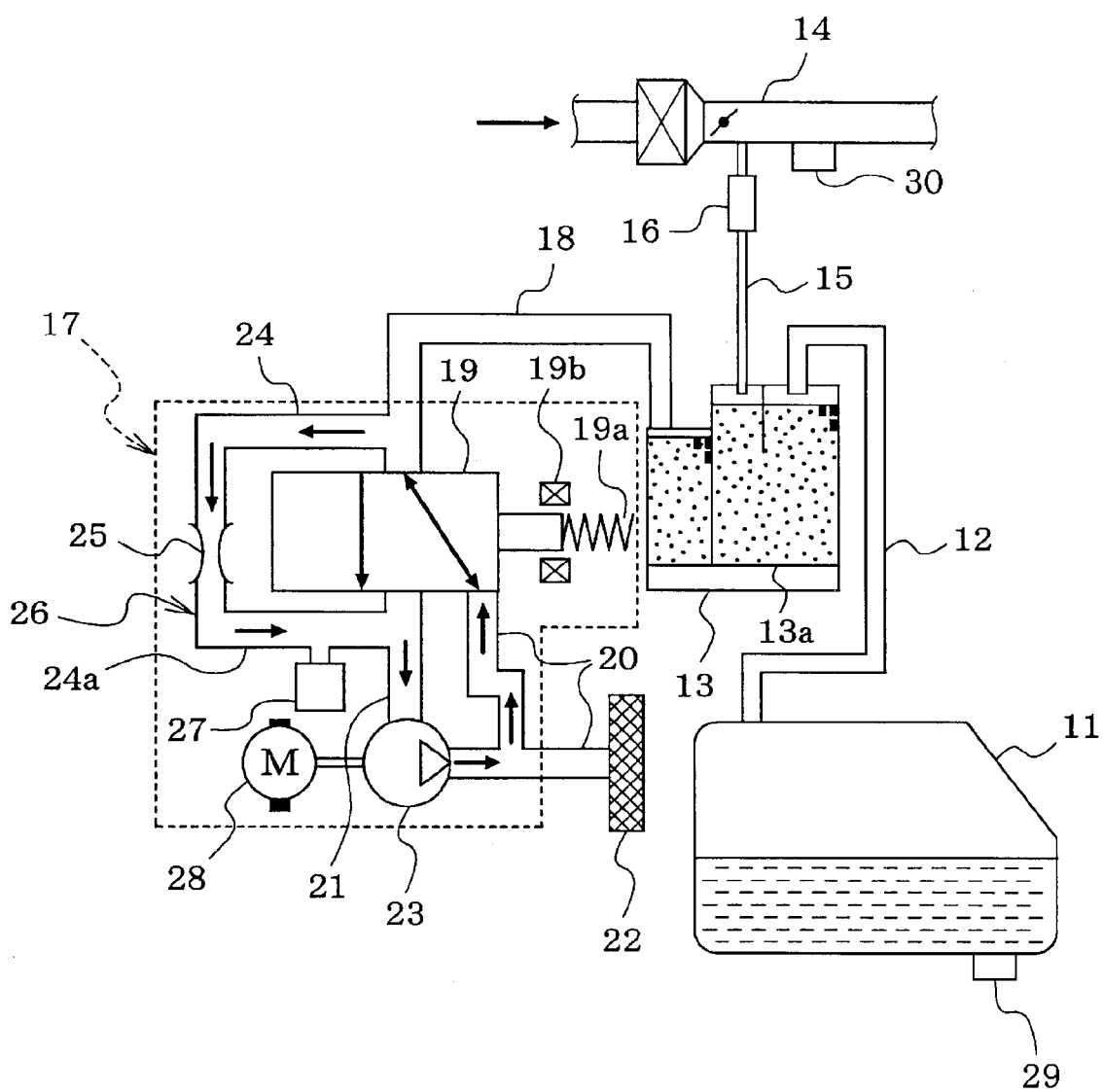
FIG. 3 is a schematic diagram showing the leakage-checking module in a standard-pressure detecting state.
Figure 4:
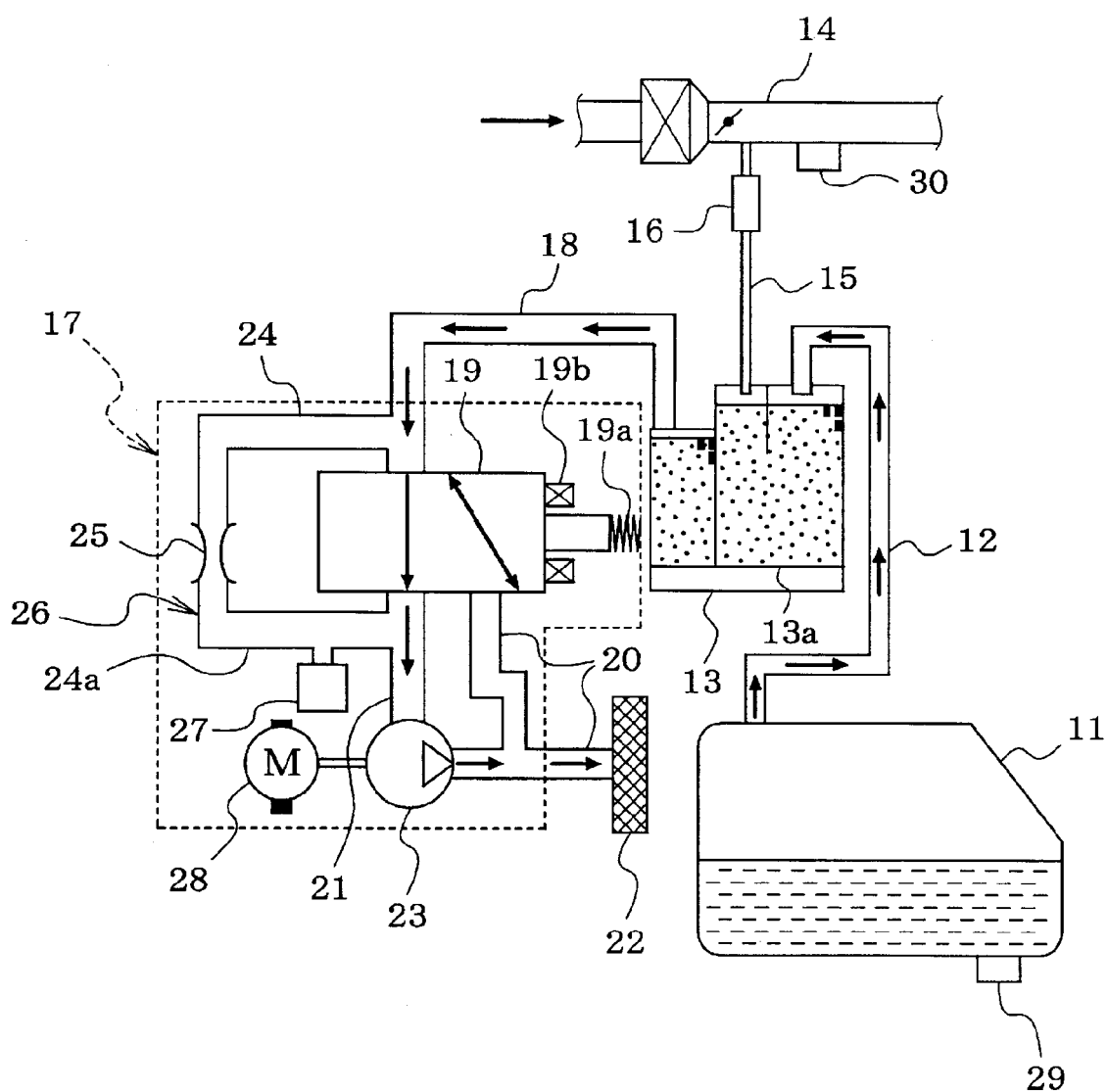
FIG. 4 is a schematic diagram showing the leakage-checking module in an evaporation-system pressure detecting state.

The passage-switching valve 19 is an electromagnetic valve that is switchable between an atmosphere position and a negative-pressure position. At the atmosphere position, the canister communication passage 18 is connected with the atmosphere communication passage 20 as shown in FIGS. 2 and 3. At the negative-pressure position, the canister communication passage 18 is connected with the negative-pressure introducing passage 21 as shown in FIG. 4. The passage-switching valve 19 has a biasing portion 19a and a solenoid 19b. For example, the biasing portion 19a may be a spring. When the passage-switching valve 19 is deenergized, the passage-switching valve 19 is held to the atmosphere position by the biasing portion 19a. When the passage-switching valve 19 is energized, the passage-switching valve 19 is held to the negative-pressure position by an electromagnetic driving force of the solenoid 19b.

A bypass passage 24 is provided between the canister communication passage 18 and the negative-pressure introducing passage 21 to bypass the passage-switching valve 19. The bypass passage 24 is provided with a standard orifice 25 that corresponds to a standard hole. The standard orifice 25 has an inner diameter less than that of other parts of the bypass passage 24. The inner diameter of the standard orifice 25 is referred to as a standard leakage diameter, for example, may be 0.5 mm. The bypass passage 24 has an orifice passage 24a that is connected with the standard orifice 25 and the negative-pressure introducing passage 21. The standard orifice 25 and the orifice passage 24a define a standard-pressure detecting portion 26. The standard-pressure detecting portion 26 is provided with a standard-pressure sensor 27 corresponding to a pressure detecting portion.

As shown in FIG. 2, when the leakage-checking module 17 is operating in a normal state, the negative-pressure pump 23 is turned off, and the passage-switching valve 19 is switched to the atmosphere position. Therefore, the bypass passage 24 is connected with the atmosphere via the atmosphere communication passage 20. In this case, an atmospheric pressure P0 can be detected by detecting a pressure in the standard-pressure detecting portion 26 according to the standard-pressure sensor 27.

As shown in FIG. 3, when the leakage-checking module 17 is operating in a standard-pressure detecting state, the purge control valve 16 is closed, the passage-switching valve 19 is switched to the atmosphere position, and the negative-pressure pump 23 is turned on. Therefore, a flow along arrows shown in FIG. 3 is generated. Specifically, the standard-pressure detecting portion 26 is connected with the evaporation system via the bypass passage 24 and the canister communication passage 18. Further, a negative pressure is generated in the standard-pressure detecting portion 26 according to the standard orifice 25. In this case, since the pressure in the standard-pressure detecting portion 26 is detected by the standard-pressure sensor 27, a standard pressure relative to the standard leakage diameter can be detected. The standard pressure corresponding to the pressure in the standard-pressure detecting portion 26 is referred to as a reference pressure.

As shown in FIG. 4, when the leakage-checking module 17 is operating in an evaporation-system pressure detecting state, the purge control valve 16 is closed, and the passage-switching valve 19 is switched to the negative-pressure position. Therefore, the evaporation system is sealed, and the standard-pressure detecting portion 26 is connected with the evaporation system via the negative-pressure introducing passage 21 and the canister communication passage 18. In this case, since the pressure in the standard-pressure detecting portion is detected by the standard-pressure sensor 27, a pressure in the evaporation system can be detected. Further, when the negative-pressure pump 23 is turned on, a flow along arrows shown in FIG. 4 is generated, the gas in the evaporation system is discharged to the atmosphere via the canister 13, and the negative pressure is introduced into the evaporation system.

As shown in FIG. 1, the tank 11 is provided with a fuel-temperature sensor 29 detecting a fuel temperature, and the intake pipe 14 is provided with an intake-pressure sensor 30 detecting a pressure in the intake pipe 14. Further, various sensors are provided, such as a water-temperature sensor 31 detecting a temperature of a coolant. The temperature of the coolant is referred to as a coolant temperature.

Outputs of the above various sensors are transmitted to an electronic control unit (ECU) 32. The ECU 32 is constructed by a microcomputer having a storage media storing various programs for controlling the engine. For example, the storage media may be a ROM. The ECU 32 executes the programs according to an operating state of the engine to control a fuel injection amount, an ignition time point, a throttle opening degree, or an intake-air amount, and executes a purge control to control the purging flow-volume by controlling the purge control valve 16.

The ECU 32 executes a leakage-diagnosis routine to control the leakage-checking module 17 to detect the standard pressure and the pressure in the evaporation system while the engine is stopped, and executes the leakage diagnosis to determine whether the evaporation system has a leakage by comparing the standard pressure to the pressure in the evaporation system. In this case, the pressure in the evaporation system is referred to as an evaporation-system pressure.

Figure 5:
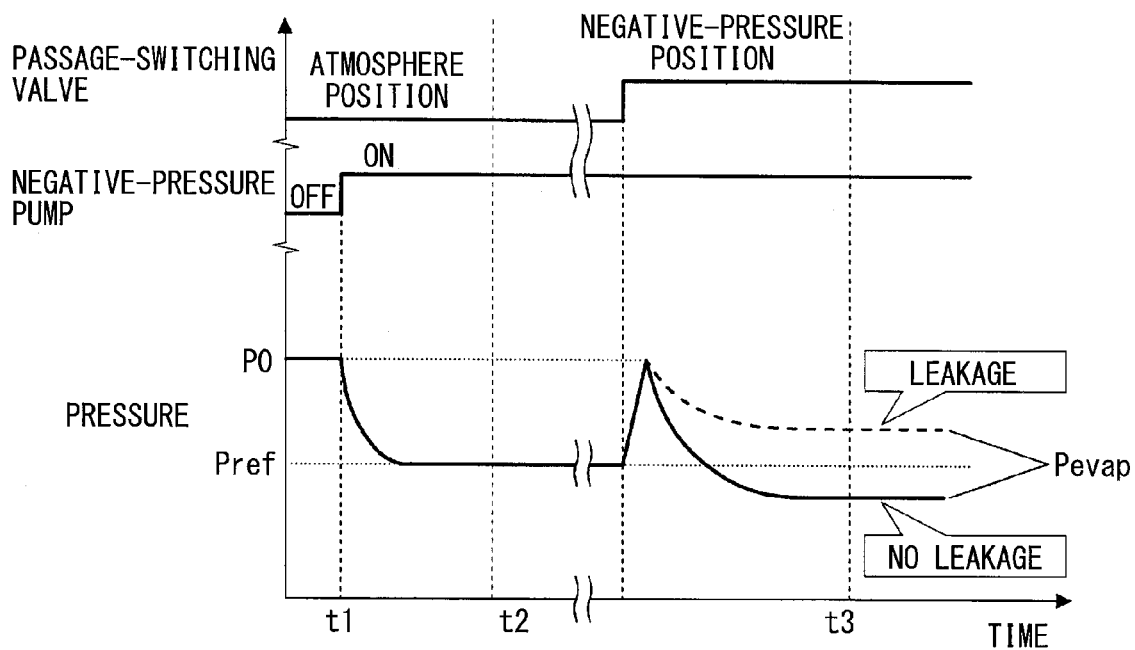
FIG. 5 is a time chart showing a leakage diagnosis.

Hereafter, the leakage diagnosis of the evaporation system will be described. As shown in FIG. 5, the ECU 32 starts a standard-pressure detecting operation at a time point t1 that a predetermined time period has elapsed after the engine is stopped. For example, the predetermined time period may be 3 to 5 hours. In the standard-pressure detecting operation corresponding to a standard-pressure detecting part, the purge control valve 16 is maintained to be closed, the passage-switching valve 19 is held to the atmosphere position, the negative-pressure pump 23 is turned on, and the negative pressure is introduced into the standard-pressure detecting portion 26. The ECU 32 determines that the negative pressure in the standard-pressure detecting portion 26 stabilizes in the vicinity of the standard pressure at a time point t2 that a predetermined time period T1 has elapsed after the negative pressure starts to be introduced into the standard-pressure detecting portion 26, and detects the pressure in the standard-pressure detecting portion 26 as the standard pressure Pref. In this case, the time point t2 is a time point that the pressure in the standard-pressure detecting portion 26 becomes stable.

The ECU 32 starts an evaporation-system pressure detecting operation after detecting the standard pressure Pref. In the evaporation-system pressure detecting operation corresponding to an evaporation-system pressure detecting part, the negative-pressure pump 23 is held to be turned on, the passage-switching valve 19 is switched to the negative-pressure position, and the negative pressure is introduced into the evaporation system according to the negative-pressure pump 23. The ECU 32 detects the evaporation-system pressure Pevap according to the standard-pressure sensor 27 at a time point t3 that a predetermined time period T2 has elapsed after the negative pressure starts to be introduced into the evaporation system. In this case, the time point t3 is a time point that the pressure in the evaporation system becomes stable.

Then, the ECU 32 compares the evaporation-system pressure Pevap to the standard pressure Pref. As a solid line shown in FIG. 5, when the evaporation-system pressure Pevap is less than or equal to the standard pressure Pref, the ECU 32 determines that no leakage is generated, that is, no leakage hole has a diameter greater than the standard leakage diameter. As a dashed line shown in FIG. 5, when the evaporation-system pressure Pevap is greater than the standard pressure Pref, the ECU 32 determines that a leakage is generated, that is, a leakage hole having a diameter greater than the standard leakage diameter exists.

However, when an evaporated-gas amount in the evaporation system is excessive such that an evaporated-gas adsorbed amount in the canister 13 becomes a saturation value, the evaporated gas unable to be completely adsorbed at the canister 13 may flow into the leakage-checking module 17 according to the negative-pressure pump 23. A state that the evaporated-gas adsorbed amount becomes the saturation value is referred to as a saturation state corresponding to a breakthrough state. Since a density of the evaporated gas is greater than a density of the atmosphere, the standard pressure Pref varies due to a difference in the density of a fluid. The fluid corresponds to the air or the evaporated gas. The density of the fluid is referred to as a fluid density.

Figure 6:
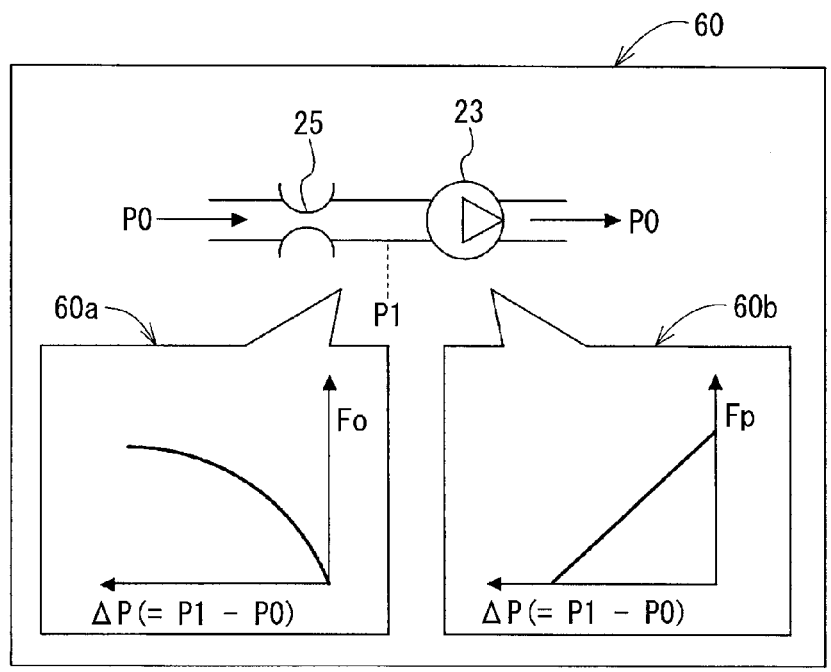
FIG. 6 is a diagram showing an orifice flow-volume property and a pump flow-volume property.

FIG. 6 is a diagram showing a property of an orifice flow-volume Fo and a property of a pump flow-volume Fp. The orifice flow-volume Fo corresponds to a flow volume of the flow flowing through the standard orifice 25, and the pump flow-volume Fp corresponds to a flow volume of the flow introduced by the negative-pressure pump 23. Further, the property of the orifice flow-volume Fo is referred to as an orifice flow-volume property, and the property of the pump flow-volume Fp is referred to as a pump flow-volume property. The orifice flow-volume Fo and the pump flow-volume Fp can be computed according to formals (i) and (ii) by using a differential pressure $\Delta P$ of the standard orifice 25 or the negative-pressure pump 23. The differential pressure $\Delta P$ is a difference obtained by subtracting the atmospheric pressure P0 from the negative pressure P1, and the differential pressure $\Delta P$ is a negative value.

$$Fo = \alpha \times Ea \times \sqrt{\frac{2 \times |\Delta P|}{\rho}} \quad \text{(Bernoulli's principle)} \quad (i)$$

$$Fp = Sp \times \Delta P + Fp0 \quad (ii)$$

According to formula (i), $\alpha$ represents a flow-volume coefficient, Ea represents an effective sectional-area, and $\rho$ represents the fluid density. According to formula (ii), Sp represents a slope of the pump flow-volume property, and Fp0 represents the pump flow-volume Fp of when the differential pressure $\Delta P$ is zero. Further, in FIG. 6, 60 indicates variations in pressure of the standard orifice 25 and the negative-pressure pump 23, 60a indicates a relationship between the orifice flow-volume Fo and the differential pressure $\Delta P$ of the standard orifice 25, and 60b indicates a relationship between the pump flow-volume Fp and the differential pressure $\Delta P$ of the negative-pressure pump 23.

When the leakage-checking module 17 is operating in the standard-pressure detecting state, a differential flow-volume subtracting the orifice flow-volume Fo from the pump flow-volume Fp is a flow volume actually removed by the negative-pressure pump 23. In this case, the flow volume actually removed by the negative-pressure pump 23 is referred to as a removed flow-volume. Further, the standard pressure Pref decreases in accordance with an increase in removed flow-volume.

When the fluid density ρ is large, the evaporated gas flows into the leakage-checking module 17, and the fluid having the density greater than the air flows through the standard orifice 25. In this case, the orifice flow-volume Fo becomes less than that of when the air flows through the standard orifice 25, but the pump flow-volume Fp maintains to the same of when the air flows through the standard orifice 25. Thus, the removed flow-volume increases, and the standard pressure Pref decreases. When the leakage diagnosis is executed, since the evaporation-system pressure Pevap becomes greater than the standard pressure Pref even though the evaporation system is normal, it may be erroneously determined that the leakage is generated.

According to the first embodiment, since the ECU 32 executes the leakage-diagnosis routine, the ECU 32 determines whether the evaporated-gas amount in the evaporation system is in an excessive state while the engine is stopped. In the excessive state, the evaporated-gas amount is excessive such that the evaporated-gas adsorbed amount becomes the value in the saturation state or becomes a value close to the value in the saturation state. When the ECU 32 determines that the evaporated-gas amount is in the excessive state, the ECU 32 terminates the leakage diagnosis.

According to the first embodiment, the ECU 32 determines whether the evaporated-gas amount is in the excessive state by comparing a present pressure to a previous pressure. The present pressure is detected by the standard-pressure sensor 27 at a predetermined time point in a present leakage diagnosis. For example, the present pressure is the standard pressure Pref. The previous pressure is detected by the standard-pressure sensor 27 at the predetermined time point in a case where the ECU 32 determines the evaporated-gas amount is in a non-excessive state. The non-excessive state is a state other than the excessive state. For example, the previous pressure is the standard pressure Prefold.

As the above description, when the evaporated-gas amount is in the excessive state, the standard pressure Pref affected due to the evaporated gas is less than that of when the evaporated-gas amount is in the non-excessive state. Therefore, the ECU 32 can accurately determine whether the evaporated-gas amount is in the excessive state by comparing the standard pressure Pref to the standard pressure Prefold.

According to the first embodiment, the ECU 32 executes a purge control routine such that the evaporated-gas amount is in the excessive state, and the ECU 32 terminates the leakage diagnosis. In this case, the ECU 32 executes a forced purge control in a next operation of the engine. In the forced purge control, the ECU 32 positively executes a purging of the evaporated gas.

Hereafter, referring to FIGS. 7 and 8, routines executed by the ECU 32 according to the first embodiment will be described.

Figure 7:
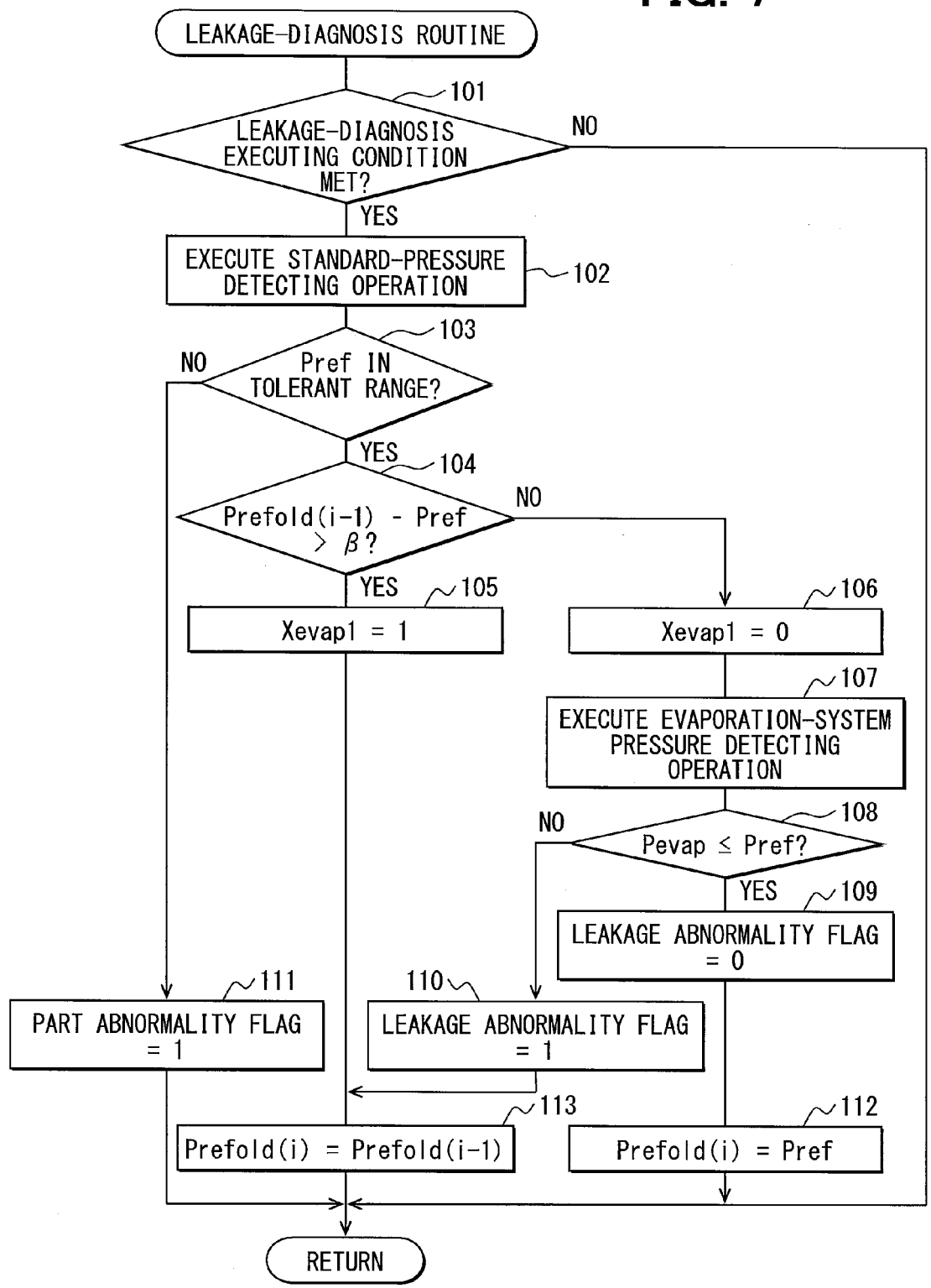
FIG. 7 is a flowchart showing a leakage-diagnosis routine according to the first embodiment.

As shown in FIG. 7, the ECU 32 starts the leakage-diagnosis routine corresponding to a leakage-diagnosis portion at a predetermined period according to a timer, after the predetermined time period has elapsed since the engine is stopped. At 101, the ECU 32 determines whether a leakage-diagnosis executing condition is met. For example, the ECU 32 determines whether a temperature condition of the coolant temperature or an intake-air temperature, an atmosphere condition, or a condition of an engine operating state before an ignition switch (IG switch) is turned off, is met. When the ECU 32 determines that the leakage-diagnosis executing condition is not met at 101, the ECU 32 terminates the present routine without proceeding to next step.

When the ECU 32 determines that the leakage-diagnosis executing condition is met at 101, the ECU 32 proceeds to 102. At 102, the ECU 32 executes the standard-pressure detecting operation. In the standard-pressure detecting operation, the purge control valve 16 is maintained to be closed, the passage-switching valve 19 is held to the atmosphere position, the negative-pressure pump 23 is turned on, and the negative pressure is introduced into the standard-pressure detecting portion 26. The ECU 32 determines that the negative pressure in the standard-pressure detecting portion 26 stabilizes in the vicinity of the standard pressure at a time point that the predetermined time period T1 has elapsed after the negative pressure starts to be introduced into the standard-pressure detecting portion 26, and detects the pressure in the standard-pressure detecting portion 26 as the standard pressure Pref.

Then, the ECU 32 proceeds to 103, and determines whether the standard pressure Pref is in a tolerant range. The tolerant range is a normal range of the standard pressure Pref, and is previously set by considering tolerances of parts of the leakage-checking module 17.

When the ECU 32 determines that the standard pressure Pref is not in the tolerant range at 103, the ECU 32 determines that a part of the leakage-checking module 17 is out of a performance standard. The ECU 32 proceeds to 111, sets a part abnormality flag to 1, and terminates the present routine.

When the ECU 32 determines that the standard pressure Pref is in the tolerant range at 103, the ECU 32 proceeds to 104. At 104, the ECU 32 determines whether the evaporated-gas amount is in the excessive state by determining whether a difference obtained by subtracting the present pressure Pref from the previous pressure Prefold(i−1) is greater than a determining value β that is predetermined.

In this case, the previous pressure Prefold is the standard pressure detected in the leakage diagnosis in a case where the ECU 32 determines the evaporated-gas amount is in the non-excessive state. The non-excessive state is a state other than the excessive state. For example, the previous pressure is the standard pressure Prefold. Further, an initial value Prefold(0) of the previous pressure may be a property center-value of the standard pressure Pref.

When the ECU 32 determines that the difference obtained by subtracting the present pressure Pref from the previous pressure Prefold(i−1) is greater than the determining value β at 104, the ECU 32 determines that the evaporated-gas amount is in the excessive state and proceeds to 105. At 105, the ECU 32 sets a first excessive determining flag Xevap1 to 1.

In this case, when the leakage diagnosis is continued, since the evaporation-system pressure Pevap becomes greater than the standard pressure Pref even though the evaporation system is normal, the ECU 32 may erroneously determine that the leakage is generated. Therefore, the ECU 32 terminates the leakage diagnosis. At 113, the ECU 32 sets a present value Prefold(i) of the previous pressure to a previous value Prefold(i−1) of the previous pressure, and terminates the present routine.

Prefold(i)=Prefold(i−1)

When the ECU 32 determines that the difference obtained by subtracting the present pressure Pref from the previous pressure Prefold(i−1) is less than or equal to the determining value β at 104, the ECU 32 determines that the evaporated-gas amount is in the non-excessive state, and proceeds to 106. At 106, the ECU 32 sets the first excessive determining flag Xevap1 to zero. At 107, the ECU 32 executes the evaporation-system pressure detecting operation. In the evaporation-system pressure detecting operation, the negative-pressure pump 23 is held to be turned on, the passage-switching valve 19 is switched to the negative-pressure position, and the negative pressure is introduced into the evaporation system according to the negative-pressure pump 23. The ECU 32 detects the evaporation-system pressure Pevap according to the standard-pressure sensor 27 at a time point that the predetermined time period T2 has elapsed after the negative pressure starts to be introduced into the evaporation system.

At 108, the ECU 32 determines whether the evaporation-system pressure Pevap is less than or equal to the standard pressure Pref. When the ECU 32 determines that the evaporation-system pressure Pevap is less than or equal to the standard pressure Pref at 108, the ECU 32 proceeds to 109. At 109, the ECU 32 sets a leakage abnormality flag to zero. At 112, the ECU 32 sets the present value Prefold(i) to the present pressure Pref, and terminates the present routine.

Prefold(i)=Pref

When the ECU 32 determines that the evaporation-system pressure Pevap is greater than the standard pressure Pref at 108, the ECU 32 proceeds to 110. At 110, the ECU 32 determines that the leakage is generated, and sets the leakage abnormality flag to 1. At 113, the ECU 32 sets the present value Prefold(i) to the previous value Prefold(i−1), and terminates the present routine.

Prefold(i)=Prefold(i−1)

Operations in 104 to 106 correspond to a determining portion. Further, the evaporated-gas excessive determining flag Xevap1, the leakage abnormality flag, the parts abnormality flag, and the previous pressure Prefold(i), are stored in a nonvolatile memory such that they can be referred in a next start of the engine. The nonvolatile memory is a memory that can be rewritten and stores data even though the ECU 32 is deenergized, for example, a backup RAM (not shown) of the ECU 32.

Figure 8:
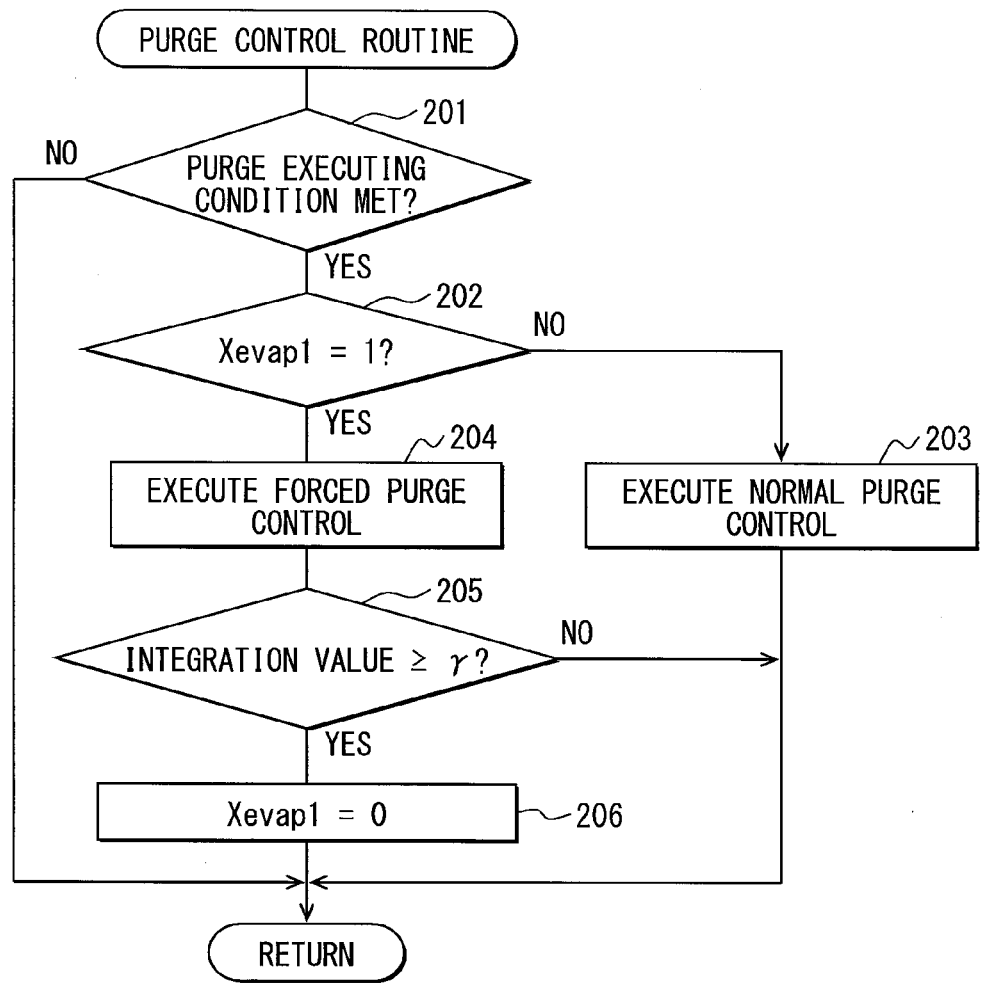
FIG. 8 is a flowchart showing a purge-control routine.
Figure 9:
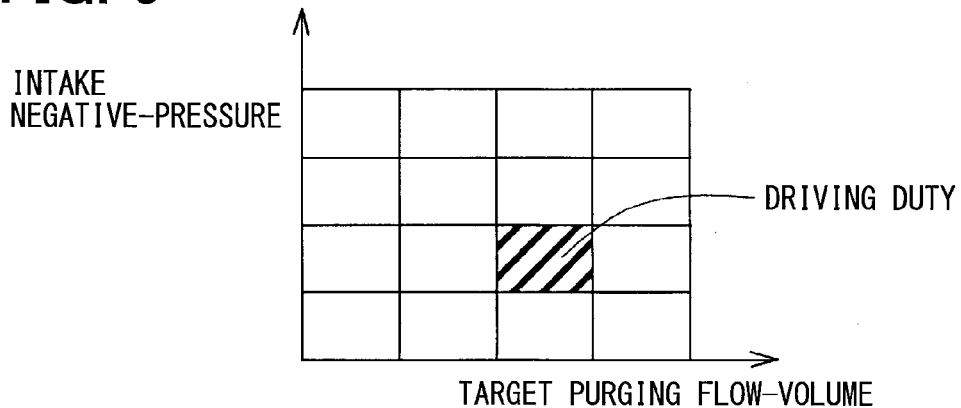
FIG. 9 is a diagram showing an example of a driving-duty map.

As shown in FIG. 8, the ECU 32 executes the purge control routine corresponding to a control portion at a predetermined period when the engine is operating. At 201, the ECU 32 determines whether a purge executing condition is met. For example, the ECU 32 determines based on the coolant temperature, a battery voltage, or an air-fuel ratio feedback control state. When the ECU 32 determines that the purge executing condition is not met at 201, the ECU 32 terminates the present routine without proceeding to next step.

When the ECU 32 determines that the purge executing condition is met at 201, the ECU 32 proceeds to 202. At 202, the ECU 32 determines whether the first excessive determining flag Xevap1 is set to 1.

When the ECU 32 determines that the first excessive determining flag Xevap1 is zero that is not equal to 1, the ECU 32 proceeds to 203 and executes a normal purge control. In the normal purge control, the ECU 32 computes a target purging flow-volume according to the intake-air amount to achieve a target purging rate. Then, the ECU 32 computes a driving duty of the normal purge control according to the target purging flow-volume and an intake negative-pressure with reference to a map of the driving duty shown in FIG. 9. The intake negative-pressure represents a negative pressure of the intake system. The ECU 32 controls an energization of the purge control valve 16 by the duty control that uses the driving duty of the normal purge control.

When the ECU 32 determines that the first excessive determining flag Xevap1 is 1, the ECU 32 proceeds to 204. In this case, since the evaporated-gas amount is in the excessive state in previous engine stop, the leakage diagnosis is prohibited or terminated. At 204, the ECU 32 executes the forced purge control. In the forced purge control, the ECU 32 computes a driving duty of the forced purge control according to a map of the driving duty (not shown), after computing the target purging flow-volume. In the map of the driving duty of the forced purge control, the driving duty is greater than that of the normal purge control. For example, the driving duty of the forced purge control is twice the driving duty of the normal purge control. The ECU 32 controls the energization of the purge control valve 16 by the duty control that uses the driving duty of the forced purge control. Therefore, the ECU 32 positively executes the purging of the evaporated gas in the next operation of the engine in a case where the leakage diagnosis is prohibited or terminated in previous engine stop, and the purging flow-volume of the evaporated gas is greater than that of the normal purge control.

At 205, the ECU 32 determines whether an integration value in present engine operation is greater than or equal to a predetermined value γ. The integration value is a value obtained by integrating the purging flow-volume of the evaporated gas. When the ECU 32 determines that the integration value is less than the predetermined value γ, the ECU 32 determines that the purging flow-volume is insufficient, holds the first excessive determining flag Xevap1 to 1, and terminates the present routine. Therefore, the ECU 32 continues the forced purge control.

When the ECU 32 determines that the integration value in present engine operation is greater than or equal to the predetermined value γ at 205, the ECU 32 determines that the purging flow-volume is sufficient, and proceeds to 206. At 206, the ECU 32 sets the first excessive determining flag Xevap1 to zero and terminates the present routine. Therefore, the ECU 32 terminates the forced purge control.

According to the first embodiment, the ECU 32 determines whether the evaporated-gas amount is in the excessive state in the leakage diagnosis while the engine is stopped. When the ECU 32 determines that the evaporated-gas amount is in the excessive state, the ECU 32 terminates the leakage diagnosis. Therefore, a diagnosis accuracy of the leakage diagnosis can be ensured.

According to the first embodiment, when the evaporated-gas amount is in the excessive state, the standard pressure Pref affected due to the evaporated gas is less than that of when the evaporated-gas amount is in the non-excessive state. Further, the ECU 32 determines whether the evaporated-gas amount is in the excessive state by comparing the standard pressure Pref to the standard pressure Prefold. Therefore, the ECU 32 can accurately determine whether the evaporated-gas amount is in the excessive state by using the standard pressure Pref.

According to the first embodiment, when the leakage diagnosis is terminated because the ECU 32 determines that the evaporated-gas amount is in the excessive state, the ECU 32 executes the forced purge control. Therefore, the evaporated-gas amount is positively decreased, and it is difficult to determine that the evaporated-gas amount is in the excessive state. Thus, a possibility of prohibiting or terminating the leakage diagnosis in a next stop of the engine becomes lower, and the leakage diagnosis can be frequently executed.

According to the first embodiment, the driving duty of the purge control valve 16 is increased to increase the purging flow-volume in the forced purge control. It is not limited to the above, for example, the purging is frequently executed to increase the purging flow-volume.

Second Embodiment

Next, referring to FIGS. 10 to 15, a second embodiment according to the present disclosure will be described. The substantially same parts and the components as the first embodiment are indicated with the same reference numeral and the same description will not be reiterated. Hereafter, features of the third embodiment different from the first embodiment will be detailed.

Figure 10:
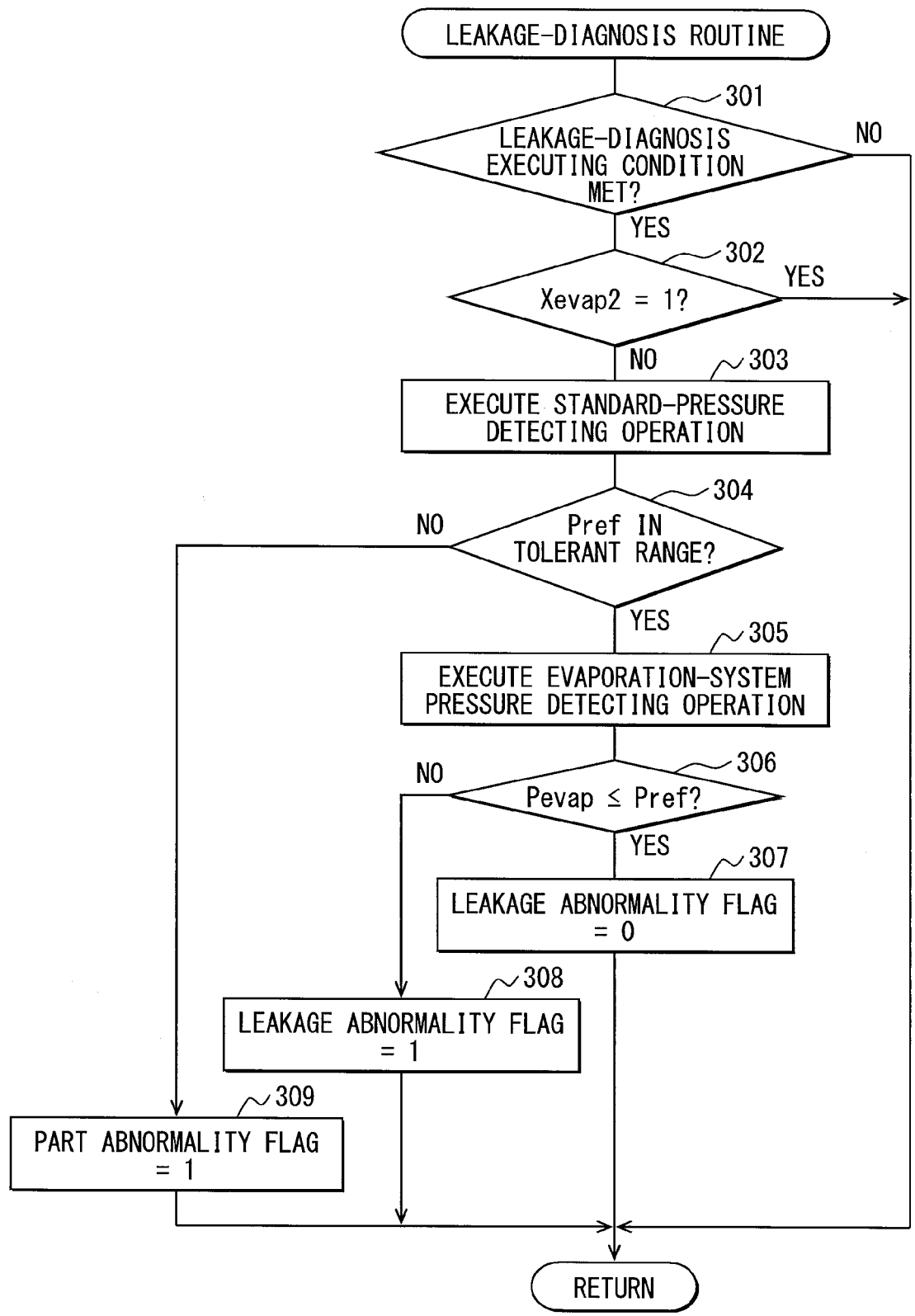
FIG. 10 is a flowchart showing a leakage-diagnosis routine according to a second embodiment of the present disclosure.
Figure 11:
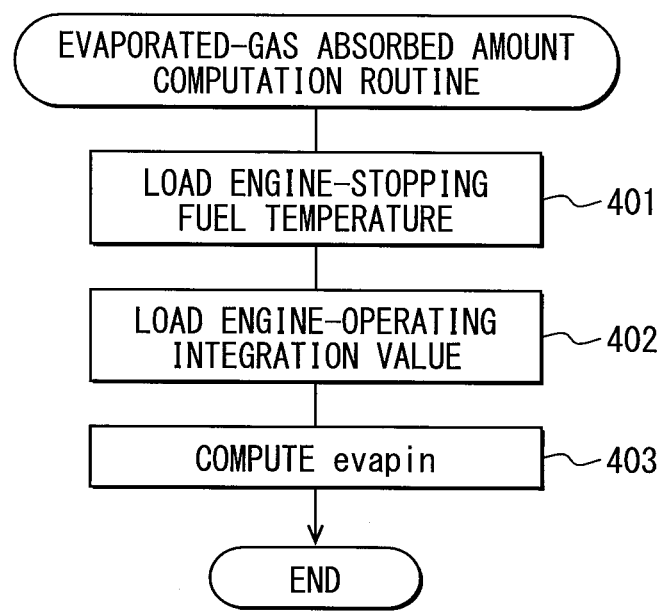
FIG. 11 is a flowchart showing an evaporated-gas adsorbed amount computation routine.
Figure 12:
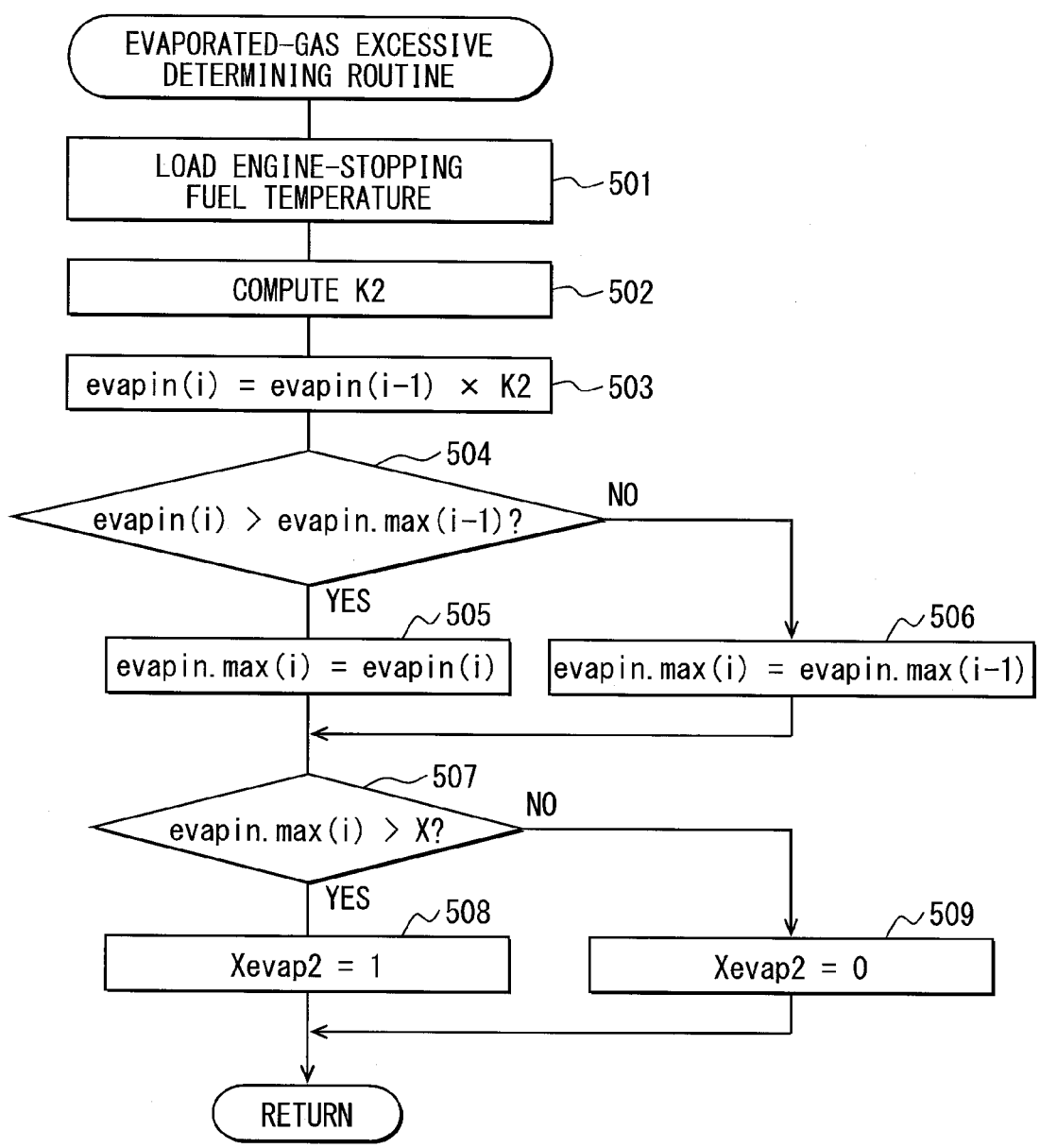
FIG. 12 is a flowchart showing an evaporated-gas excessive determination routine.

According to the second embodiment, the ECU 32 executes routines for the leakage diagnosis as shown in FIGS. 10 to 12. The ECU 32 estimates the evaporated-gas adsorbed amount of the canister 13 based on the fuel temperature in a case where the engine is stopped before the leakage diagnosis is started, and determines whether the evaporated-gas amount is in the excessive state by comparing the evaporated-gas adsorbed amount to a predetermined value. The evaporated-gas adsorbed amount corresponds to an evaporated-gas amount information. When the ECU 32 determines that the evaporated-gas amount is in the excessive state, the ECU 32 prohibits the leakage diagnosis.

Since the evaporated-gas amount varies according to the fuel temperature in a case where the engine is stopped, the evaporated-gas adsorbed amount varies. The ECU 32 can accurately estimate the evaporated-gas adsorbed amount by using the fuel temperature. Further, the ECU 32 can accurately determine whether the evaporated-gas amount is in the excessive state by comparing the evaporated-gas adsorbed amount to the predetermined value.

Hereafter, referring to FIGS. 10 to 12, routines executed by the ECU 32 according to the second embodiment will be described.

As shown in FIG. 10, at 301, the ECU 32 determines whether the leakage-diagnosis executing condition is met. When the ECU 32 determines that the leakage-diagnosis executing condition is not met, the ECU 32 terminates the present routine. When the ECU 32 determines that the leakage-diagnosis executing condition is met, the ECU 32 proceeds to 302. At 302, the ECU 32 determines whether a second excessive determining flag Xevap2 is set to 1. The second excessive determining flag Xevap2 is set by an evaporated-gas excessive determining routine shown in FIG. 12.

When the ECU 32 determines that the second excessive determining flag Xevap2 is 1 at 302, the ECU 32 determines that the evaporated-gas amount is in the excessive state. Therefore, the ECU 32 terminates the present routine without proceeding to next step. In other words, the ECU 32 prohibits the leakage diagnosis.

When the ECU 32 determines that the second excessive determining flag Xevap2 is zero that is not equal to 1 at 302, the ECU 32 proceeds to 303. At 303, the ECU 32 executes the standard-pressure detecting operation to detect the standard pressure Pref.

At 304, the ECU 32 determines whether the standard pressure Pref is in the tolerant range. When the ECU 32 determines that the standard pressure Pref is not in the tolerant range at 304, the ECU 32 proceeds to 309. At 309, the ECU 32 sets the parts abnormality flag to 1 and terminates the present routine.

When the ECU 32 determines that the standard pressure Pref is in the tolerant range at 304, the ECU 32 proceeds to 305. At 305, the ECU 32 executes the evaporation-system pressure detecting operation to detect the evaporation-system pressure Pevap.

At 306, the ECU 32 determines whether the evaporation-system pressure Pevap is less than or equal to the standard pressure Pref. When the ECU 32 determines that the evaporation-system pressure Pevap is less than or equal to the standard pressure Pref at 306, the ECU 32 proceeds to 307. At 307, the ECU 32 determines that the leakage is not generated and resets the leakage abnormality flag to zero.

When the ECU 32 determines that the evaporation-system pressure Pevap is greater than the standard pressure Pref at 306, the ECU 32 proceeds to 308. At 308, the ECU 32 determines that the leakage is generated and sets the leakage abnormality flag to 1.

The ECU 32 executes an evaporated-gas adsorbed amount computation routine shown in FIG. 11 at or right after a time point that the engine is stopped. At 401, the ECU 32 loads the fuel temperature detected by the fuel-temperature sensor 29 at or right after the time point that the engine is stopped as an engine-stopping fuel temperature. At 402, the ECU 32 loads the integration value while the engine is operating as an engine-operating integration value.

At 403, the ECU 32 computes the evaporated-gas adsorbed amount evapin based on the engine-stopping fuel temperature and the engine-operating integration value. The evaporated-gas adsorbed amount evapin corresponds to an initial value of the evaporated-gas adsorbed amount while the engine is stopped.

Figure 13:
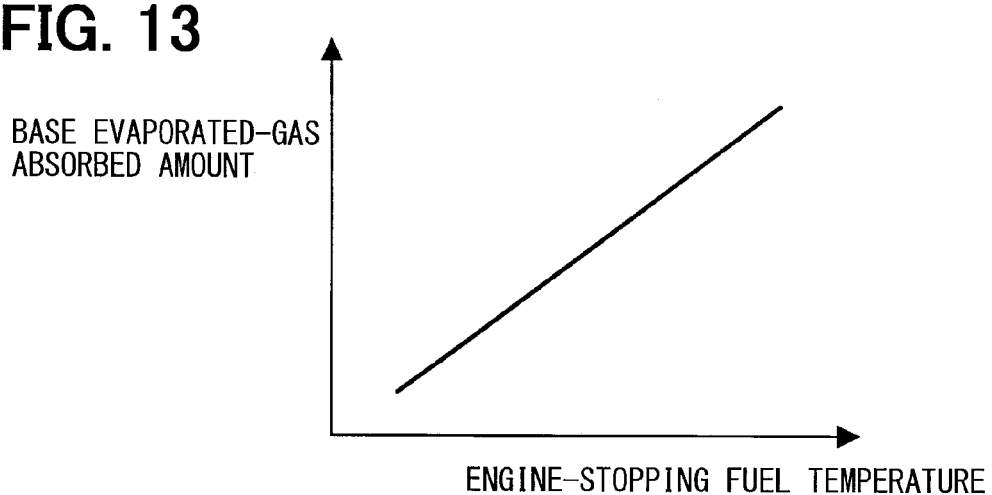
FIG. 13 is a diagram showing a table of a base evaporated-gas adsorbed amount.

The ECU 32 computes a base evaporated-gas adsorbed amount according to the engine-stopping fuel temperature, by referring to a table of the base evaporated-gas adsorbed amount shown in FIG. 13. Usually, a generation amount of the evaporated gas in the tank 11 increases in accordance with an increase in fuel temperature, and then the evaporated-gas adsorbed amount of the canister 13 becomes larger. Considering the above property, the table of the base evaporated-gas adsorbed amount shown in FIG. 13 is set so that the base evaporated-gas adsorbed amount increases in accordance with an increase in engine-stopping fuel temperature.

Figure 14:
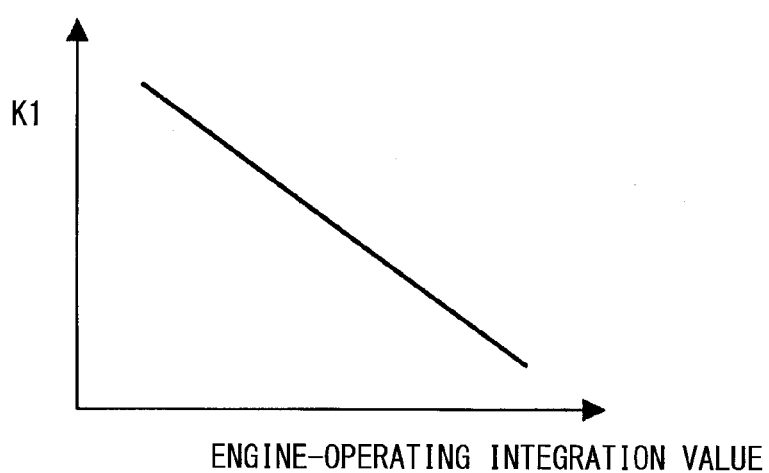
FIG. 14 is a diagram showing a table of a correction coefficient K1.

Further, the ECU 32 computes a correction coefficient K1 according to the engine-operating integration value, by referring to a table of the correction coefficient K1 shown in FIG. 14. Usually, when the purging flow-volume is small while the engine is operating, a flow-volume of the evaporated gas released from and pass through the canister 13 is small. Therefore, the evaporated-gas adsorbed amount of the canister 13 becomes larger. In contrast, when the purging flow-volume is large while the engine is operating, the flow-volume of the evaporated gas released from and pass through the canister 13 is large. Therefore, the evaporated-gas adsorbed amount of the canister 13 becomes smaller. Considering the above property, the table of the correction coefficient K1 shown in FIG. 14 is set so that the correction coefficient K1 decreases in accordance with an increase in engine-operating integration value.

The ECU 32 computes the evaporated-gas adsorbed amount evapin of the canister 13 of when the engine is stopped by multiplying the base evaporated-gas adsorbed amount by the correction coefficient K1, after the ECU 32 computes the base evaporated-gas adsorbed amount and the correction coefficient K1.

As shown in FIG. 12, the ECU 32 starts the evaporated-gas excessive determining routine at a predetermined time period according to a timer, after the engine is stopped. In this case, the predetermined time period may be 30 minutes. At 501, the ECU 32 loads the fuel temperature detected by the fuel-temperature sensor 29 as the engine-stopping fuel temperature.

Figure 15:
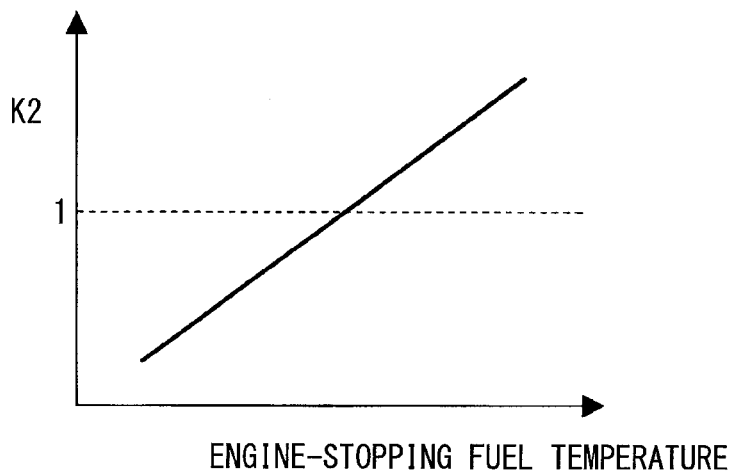
FIG. 15 is a diagram showing a table of a correction coefficient K2.

At 502, the ECU 32 computes a correction coefficient K2 according to the engine-stopping fuel temperature, by referring to a table of the correction coefficient K2 shown in FIG. 15. Usually, the generation amount of the evaporated gas in the tank 11 increases in accordance with the increase in fuel temperature, and then the evaporated-gas adsorbed amount of the canister 13 becomes larger. Considering the above property, the table of the correction coefficient K2 shown in FIG.

15 is set so that the correction coefficient K2 increases in accordance with the increase in engine-stopping fuel temperature.

At 503, the ECU 32 computes a present evaporated-gas adsorbed amount evapin(i) by multiplying a previous evaporated-gas adsorbed amount evapin(i−1) by the correction coefficient K2.

In other words, the ECU 32 updates the evaporated-gas adsorbed amount evapin based on the fuel temperature that is obtained at the predetermined time period in a case where the engine is stopped. When the fuel temperature decreases, the evaporated-gas adsorbed amount evapin may decrease, but an actual evaporated-gas adsorbed amount does not decrease. Therefore, the ECU 32 computes the maximum value of the evaporated-gas adsorbed amount at 504 to 506.

At 504, the ECU 32 determines whether the present evaporated-gas adsorbed amount evapin(i) is greater than a previous maximum value evapin.max(i−1) of the evaporated-gas adsorbed amount.

When the ECU 32 determines that the present evaporated-gas adsorbed amount evapin(i) is greater than the previous maximum value evapin.max(i−1) at 504, the ECU 32 proceeds to 505. At 505, the ECU 32 updates a present maximum value evapin.max(i) of the evaporated-gas adsorbed amount to the present evaporated-gas adsorbed amount evapin(i).

That is, evapin.max(i)=evapin(i).

When the ECU 32 determines that the present evaporated-gas adsorbed amount evapin(i) is less than or equal to the previous maximum value evapin.max(i−1) at 504, the ECU 32 proceeds to 506. At 506, the ECU 32 sets the present maximum value evapin.max(i) to the previous maximum value evapin.max(i−1).

That is, evapin.max(i)=evapin.max(i−1)

Further, an initial value evapin(0) of the evaporated-gas adsorbed amount and an initial value evapin.max(0) of the maximum value of the evaporated-gas adsorbed amount is the evaporated-gas adsorbed amount evapin of when the engine is stopped.

At 507, the ECU 32 determines whether the evaporated-gas amount is in the excessive state by determining whether the present maximum value evapin.max(i) of the evaporated-gas adsorbed amount is greater than a determining value X that is predetermined.

When the ECU 32 determines that the present maximum value evapin.max(i) of the evaporated-gas adsorbed amount is greater than the determining value X at 507, the ECU 32 determines that the evaporated-gas amount is in the excessive state and proceeds to 508. At 508, the ECU 32 sets the second excessive determining flag Xevap2 to 1.

When the ECU 32 determines that the present maximum value evapin.max(i) of the evaporated-gas adsorbed amount is less than or equal to the determining value X at 507, the ECU 32 determines that the evaporated-gas amount is in the non-excessive state and proceeds to 509. At 509, the ECU 32 sets the second excessive determining flag Xevap2 to zero.

Further, the second excessive determining flag Xevap2 is stored in the nonvolatile memory such as the backup RAM, and can be referred in the next start of the engine.

In the routines shown in FIGS. 10 and 11, the fuel temperature is detected by the fuel-temperature sensor 29. Alternatively, the fuel temperature can be estimated based on a temperature information about the coolant temperature or the intake-air temperature.

According to the second embodiment, when the leakage diagnosis is prohibited because the ECU 32 determines that the evaporated-gas amount is in the excessive state, the ECU 32 executes the forced purge control.

According to the second embodiment, since the evaporated-gas amount varies according to the fuel temperature in a case where the engine is stopped, the evaporated-gas adsorbed amount varies. The evaporated-gas adsorbed amount can be accurately estimated based on the engine-stopping fuel temperature. Further, the evaporated-gas amount can be accurately determined whether is in the excessive state by comparing the evaporated-gas adsorbed amount to the predetermined value.

According to the second embodiment, since the evaporated-gas adsorbed amount is computed based on the engine-stopping fuel temperature and the engine-operating integration value, the initial value of the evaporated-gas adsorbed amount can be accurately computed. Further, since the evaporated-gas adsorbed amount is updated based on the fuel temperature that is obtained at the predetermined time period in a case where the engine is stopped, the evaporated-gas adsorbed amount can be accurately estimated in a case where the leakage diagnosis is executed while the engine is stopped.

According to the second embodiment, the evaporated-gas adsorbed amount is estimated based on the fuel temperature. However, it is not limited. For example, the evaporated-gas adsorbed amount may be estimated based on an information having a correlation relative to the fuel temperature, such as the coolant temperature, an oil temperature, or the intake-air temperature. In other words, the evaporated-gas adsorbed amount may be estimated based on a fuel-temperature information that corresponds to the fuel temperature or the information having a correlation relative to the fuel temperature. Then, the evaporated-gas amount is determined whether is in the excessive state.

Third Embodiment

Next, referring to FIG. 16, a third embodiment according to the present disclosure will be described. The substantially same parts and the components as the first embodiment or the second embodiment are indicated with the same reference numeral and the same description will not be reiterated. Hereafter, features of the third embodiment different from the first embodiment or the second embodiment will be detailed.

The third embodiment is a combination of the first embodiment and the second embodiment. The ECU 32 executes a leakage-diagnosis routine as shown in FIG. 16 to terminate or prohibit the leakage diagnosis in a case where the first excessive determining flag Xevap1 or the second excessive determining flag Xevap2 is 1.

At 601, the ECU 32 determines whether the leakage-diagnosis executing condition is met. When the ECU 32 determines that the leakage-diagnosis executing condition is not met, the ECU 32 terminates the present routine. When the ECU 32 determines that the leakage-diagnosis executing condition is met, the ECU 32 proceeds to 602. At 602, the ECU 32 determines whether the second excessive determining flag Xevap2 is set to 1.

When the ECU 32 determines that the second excessive determining flag Xevap2 is 1 at 602, the ECU 32 determines that the evaporated-gas amount is in the excessive state. Therefore, the ECU 32 terminates the present routine without proceeding to next step. In other words, the ECU 32 prohibits the leakage diagnosis.

When the ECU 32 determines that the second excessive determining flag Xevap2 is zero that is not equal to 1 at 602, the ECU 32 proceeds to 603. At 603, the ECU 32 executes the standard-pressure detecting operation to detect the standard pressure Pref.

At 604, the ECU 32 determines whether the standard pressure Pref is in the tolerant range. When the ECU 32 determines that the standard pressure Pref is not in the tolerant range at 604, the ECU 32 proceeds to 612. At 612, the ECU 32 sets the parts abnormality flag to 1 and terminates the present routine.

When the ECU 32 determines that the standard pressure Pref is in the tolerant range at 604, the ECU 32 proceeds to 605. At 605, the ECU 32 determines whether the evaporated-gas amount is in the excessive state by determining whether a difference obtained by subtracting the present pressure Pref from the previous pressure Prefold(i−1) is greater than the determining value β.

When the ECU 32 determines that the difference obtained by subtracting the present pressure Pref from the previous pressure Prefold(i−1) is greater than the determining value β at 605, the ECU 32 determines that the evaporated-gas amount is in the excessive state and proceeds to 606. At 606, the ECU 32 sets a first excessive determining flag Xevap1 to 1 and terminates the leakage diagnosis. At 614, the ECU 32 sets the present value Prefold(i) of the previous pressure to the previous value Prefold(i−1) of the previous pressure.

When the ECU 32 determines that the difference obtained by subtracting the present pressure Pref from the previous pressure Prefold(i−1) is less than or equal to the determining value β at 605, the ECU 32 determines that the evaporated-gas amount is in the non-excessive state, and proceeds to 607. At 607, the ECU 32 sets the first excessive determining flag Xevap1 to zero. At 608, the ECU 32 executes the evaporation-system pressure detecting operation to detect the evaporation-system pressure Pevap.

At 609, the ECU 32 determines whether the evaporation-system pressure Pevap is less than or equal to the standard pressure Pref. When the ECU 32 determines that the evaporation-system pressure Pevap is less than or equal to the standard pressure Pref at 609, the ECU 32 proceeds to 610. At 610, the ECU 32 determines that the leakage is not generated and sets the leakage abnormality flag to zero. At 613, the ECU 32 sets the present value Prefold(i) to the present pressure Pref.

When the ECU 32 determines that the evaporation-system pressure Pevap is greater than the standard pressure Pref at 609, the ECU 32 proceeds to 611. At 611, the ECU 32 determines that the leakage is generated, and sets the leakage abnormality flag to 1. At 614, the ECU 32 sets the present value Prefold(i) to the previous value Prefold(i−1).

According to the third embodiment, when the leakage diagnosis is terminated or prohibited because the ECU 32 determines that the evaporated-gas amount is in the excessive state, the ECU 32 executes the forced purge control.

According to the third embodiment, when the first excessive determining flag Xevap1 or the second excessive determining flag Xevap2 is equal to 1, the leakage diagnosis is terminated or prohibited. Therefore, the diagnosis accuracy of the leakage diagnosis can be ensured.

According to the present disclosure, a configuration of the evaporated-gas purge system or the leakage-checking module, or a method of the leakage diagnosis, can be properly changed, as along as the present disclosure is applied to a system in which a negative pressure is introduced into an evaporation system according to a negative-pressure pump in a case where an engine is stopped.

While the present disclosure has been described with reference to the embodiments thereof, it is to be understood that the disclosure is not limited to the embodiments and constructions. The present disclosure is intended to cover various modification and equivalent arrangements. In addition, while the various combinations and configurations, which are preferred, other combinations and configurations, including more, less or only a single element, are also within the spirit and scope of the present disclosure.

What is claimed is:

1. A leakage diagnosis apparatus for an evaporated-gas purge system including a negative-pressure pump that introduces a negative pressure into an evaporation system having a tank and a canister, and a pressure detecting portion that detects the pressure in the evaporation system, the leakage diagnosis apparatus comprising
a leakage-diagnosis portion executing a leakage diagnosis to determine whether a leakage of the evaporation system is generated based on the pressure in the evaporation system in a case where the negative pressure is introduced into the evaporation system according to the negative-pressure pump while an internal combustion engine is stopped, and
a determining portion determining whether an evaporated-gas amount in the evaporation system is in an excessive state while the internal combustion engine is stopped, wherein
the leakage-diagnosis portion prohibits or terminates the leakage diagnosis, when the determining portion determines that the evaporated-gas amount is in the excessive state.

2. The leakage diagnosis apparatus according to claim 1, wherein
the determining portion determines whether the evaporated-gas amount is in the excessive state by comparing a present pressure that is detected by the pressure detecting portion at a predetermined time point in a present leakage diagnosis to a previous pressure that is detected by the pressure detecting portion at the predetermined time point in a case where the determining portion determines the evaporated-gas amount is in a non-excessive state.

3. The leakage diagnosis apparatus according to claim 1, wherein
the determining portion estimates an evaporated-gas amount information that corresponds to the evaporated-gas amount or an information having a correlation relative to the evaporated-gas amount, based on a fuel-temperature information that corresponds to a fuel temperature of when the internal combustion engine is stopped or an information having a correlation relative to the fuel temperature, and
the determining portion determines whether the evaporated-gas amount is in the excessive state by comparing the evaporated-gas amount information to a predetermined value.

4. The leakage diagnosis apparatus according to claim 3, wherein
the determining portion computes an initial value of the evaporated-gas amount information based on a purging flow-volume of a evaporated gas generated in the tank while the internal combustion engine is operating and the fuel-temperature information at or right after a time point that the internal combustion engine is stopped, and the determining portion updates the evaporated-gas amount information based on the fuel temperature that is obtained at a predetermined time period while the internal combustion engine is stopped.

5. The leakage diagnosis apparatus according to claim 1, further comprising a control portion positively executing a purging of the evaporated gas in a next operation of the internal combustion engine, in a case where the leakage diagnosis is prohibited or terminated.

6. The leakage diagnosis apparatus according to claim 1 being applied to the evaporated-gas purge system in which the evaporated gas is adsorbed in the canister and is purged into an intake system of the internal combustion engine.

7. The leakage diagnosis apparatus according to claim 1, further comprising:
- a canister communication passage connected with the canister;
- a negative-pressure introducing passage connected with the negative-pressure pump; and
- a bypass passage connected with the canister communication passage and the negative-pressure introducing passage, the bypass passage having a standard orifice that has a standard leakage diameter, wherein the determining portion includes
- a standard-pressure detecting part detecting a standard pressure generated by the standard orifice, and
- an evaporation-system pressure detecting part detecting a pressure in the evaporation system, and the determining portion determines whether the evaporated-gas amount is in the excessive state by comparing the pressure in the evaporation system detected by the evaporation-system pressure detecting part to the standard pressure detected by the standard-pressure detecting part.

* * * * *